United States Patent
Haneda (10) Patent No.: US 7,782,396 B2
(45) Date of Patent: Aug. 24, 2010

(54) FRAME RATE CONVERTING APPARATUS AND IMAGING APPARATUS

(75) Inventor: Kazuhiro Haneda, Tokyo (JP)

(73) Assignee: Olympus Corporation, Tokyo (JP)

( * ) Notice: Subject to any disclaimer, the term of this patent is extended or adjusted under 35 U.S.C. 154(b) by 1152 days.

(21) Appl. No.: 11/399,881

(22) Filed: Apr. 7, 2006

(65) Prior Publication Data

US 2007/0070212 A1    Mar. 29, 2007

(30) Foreign Application Priority Data

Sep. 29, 2005    (JP) .............................. 2005-285182

(51) Int. Cl.
*H04N 7/01* (2006.01)
*H04N 5/92* (2006.01)

(52) U.S. Cl. ................. 348/443; 348/459; 348/441; 348/445; 348/526; 348/222.1

(58) Field of Classification Search ............... 348/441, 348/443, 445, 454, 455, 459, 222.1, 513, 348/526; 386/131; 382/298
See application file for complete search history.

(56) References Cited

U.S. PATENT DOCUMENTS

2004/0081437 A1 * 4/2004 Asada et al. ............... 386/131

FOREIGN PATENT DOCUMENTS

| JP | 2005-039712 | 2/2005 |
|---|---|---|
| JP | 2005-057808 | 3/2005 |

* cited by examiner

*Primary Examiner*—David L Ometz
*Assistant Examiner*—Jean W Désir
(74) *Attorney, Agent, or Firm*—Volpe and Koenig, P.C.

(57) ABSTRACT

A frame rate converting apparatus for converting a frame rate of an input first image signal and outputting the image signal having the converted frame rate as a second image signal. The apparatus includes an input section into which the first image signal is input; a detecting section for detecting a time difference between synchronization timing of each frame of the first image signal and synchronization timing of each frame of the second image signal; a section for determining an output method of outputting the first image signal in conformity with a frame rate of the second image signal, based on a time period of each frame of the first image signal, a time period of each frame of the second image signal, and the above time difference; and an output section for outputting the first image signal as the second image signal in accordance with the determined output method.

11 Claims, 6 Drawing Sheets

FRAME RATE CONVERTING APPARATUS AND IMAGING APPARATUS

BACKGROUND OF THE INVENTION

1. Field of the Invention

The present invention relates to a frame rate converting apparatus for converting various kinds of frame rates of image signals which are generated with the frame rates, and outputting image signals in conformity with an output frame rate, and also relates to an imaging apparatus using the frame rate converting apparatus.

Priority is claimed on Japanese Patent Application No. 2005-285182, filed Sep. 29, 2005, the content of which is incorporated herein by reference.

2. Description of the Related Art

In conventional TV or movie video production, the frame rate, that is, the number of imaged frames per second, is varied in imaging so as to apply special effects to images. For example, when the frame rate of an image signal (obtained by imaging) is higher than that assigned for a reproduced signal, slow-speed reproduced images are obtained when the images are reproduced at the frame rate assigned for the reproduced signal. On the other hand, when the frame rate of an image signal is lower than that assigned for a reproduced signal, high-speed reproduced images are obtained when the images are reproduced at the frame rate assigned for the reproduced signal. The speed of such slow-speed or high-speed reproduced images depends on a variation from the frame rate of the image signal to the frame rate of the reproduced signal, and can be controlled by varying the frame rate of the image signal or the reproduced signal.

In recent years, in imaging using the technique as described above, an electronic imaging apparatus for varying the frame rate of the image signal has been popularly used. Generally, an electronic viewfinder or a monitor is connected to the electronic imaging apparatus, and the operator performs imaging while checking an image shown in the viewfinder or the monitor. However, when the frame rate of the image signal is varied while imaging, if the frame rate of the image shown in the viewfinder or the monitor is also varied, the operator cannot appropriately check the conditions necessary for imaging (e.g., an angle of view or focusing), based on the shown image. In consideration of this, a method for converting various kinds of frame rates of image signals to a desired frame rate has been suggested.

For example, in an imaging apparatus disclosed in Reference Document 1 (Japanese Unexamined Patent Application, First Publication No. 2005-039712), when the frame rate of the image signal is converted to a lower frame rate, a process of adding frames together is performed, while when the frame rate of the image signal is converted to a higher frame rate, the same frame is repeatedly used. An imaging apparatus disclosed in Reference Document 2 (Japanese Unexamined Patent Application, First Publication No. 2005-057808) has a frame rate converting section for computing a ratio between frame rates before and after conversion, and reproducing the image signal based on the computed ratio.

SUMMARY OF THE INVENTION

The present invention provides a frame rate converting apparatus for converting a frame rate of an input first image signal and outputting the image signal having the converted frame rate as a second image signal, the apparatus comprising:

an input section into which the first image signal is input;

a detecting section for detecting a time difference $\alpha$ between synchronization timing of each frame of the first image signal and synchronization timing of each frame of the second image signal;

a determining section for determining an output method of outputting the first image signal in conformity with a frame rate of the second image signal, based on a time period Cfr of each frame of the first image signal, a time period Dfr of each frame of the second image signal, and the time difference $\alpha$ detected by the detecting section; and an output section for outputting the first image signal as the second image signal in accordance with the output method determined by the determining section.

In a typical example, regarding an image signal of any frame N in the input first image signal, when the time difference $\alpha$ detected by the detecting section is zero, the determining section compares the time period Cfr of the image signal of the frame N with the frame period Dfr of the second image signal, and if Cfr$\leq$Dfr, the determining section determines that the image signal of the frame N is output as an image signal of one frame of the second image signal.

In another typical example, regarding an image signal of any frame N in the input first image signal, when the time difference $\alpha$ detected by the detecting section is zero, the determining section compares the time period Cfr of the image signal of the frame N with the frame period Dfr of the second image signal, and if Cfr>Dfr, the determining section computes a value X obtained by dividing Cfr by Dfr while counting fractions of 0.5 and over as one and disregarding the rest, and determines that a signal obtained by reproducing the image signal of the frame N X times is output as an image signal of X frames of the second image signal.

In another typical example, regarding an image signal of any frame N in the input first image signal, when the time difference $\alpha$ detected by the detecting section is not zero, the determining section refers to the time difference $\alpha$, the time period Cfr of the image signal of the frame N, and the frame period Dfr of the second image signal, and if $\alpha$<Cfr, and (Cfr$-\alpha$)$\leq$Dfr, the determining section determines that the image signal of the frame N is output as an image signal of one frame of the second image signal.

In another typical example, regarding an image signal of any frame N in the input first image signal, when the time difference $\alpha$ detected by the detecting section is not zero, the determining section refers to the time difference $\alpha$, the time period Cfr of the image signal of the frame N, and the frame period Dfr of the second image signal, and if $\alpha$<Cfr, and (Cfr$-\alpha$)>Dfr, the determining section computes a value Y obtained by dividing (Cfr$-\alpha$) by Dfr while counting fractions of 0.5 and over as one and disregarding the rest, and determines that a signal obtained by reproducing the image signal of the frame N Y times is output as an image signal of Y frames of the second image signal.

In another typical example, regarding an image signal of any frame N in the input first image signal, when the time difference $\alpha$ detected by the detecting section is not zero, the determining section compares the time difference $\alpha$ with the time period Cfr of the image signal of the frame N, and if $\alpha\geq$Cfr, the determining section determines that the image signal of the frame N is not output as the second image signal.

In a preferable example, the frame rate converting apparatus further comprises:

an image storage device for storing only each image signal determined to be output as the second image signal, among image signals of frames which form the first image signal, wherein the output section reads out each image signal from the image storage device and outputs the read out signal as the second image signal.

In addition, a value relating to the time period Cfr may be added to an image signal of each frame which forms the first image signal.

The present invention also provides an imaging apparatus comprising:
the frame rate converting apparatus as described above;
an optical device for imaging a subject;
an imaging device for performing photoelectric conversion of an image of the subject obtained by the optical device, so as to generate the first image signal; and
a signal processing section for processing the first image signal generated by the imaging device, and outputting the processed signal to the frame rate converting apparatus.

The imaging apparatus may further comprise a section for setting the frame rate of the first image signal, or a section for setting the frame rate of the second image signal.

DESCRIPTION OF THE PREFERRED EMBODIMENTS

Hereinafter, embodiments according to the present invention will be described with reference to the appended figures.

Figure 1:
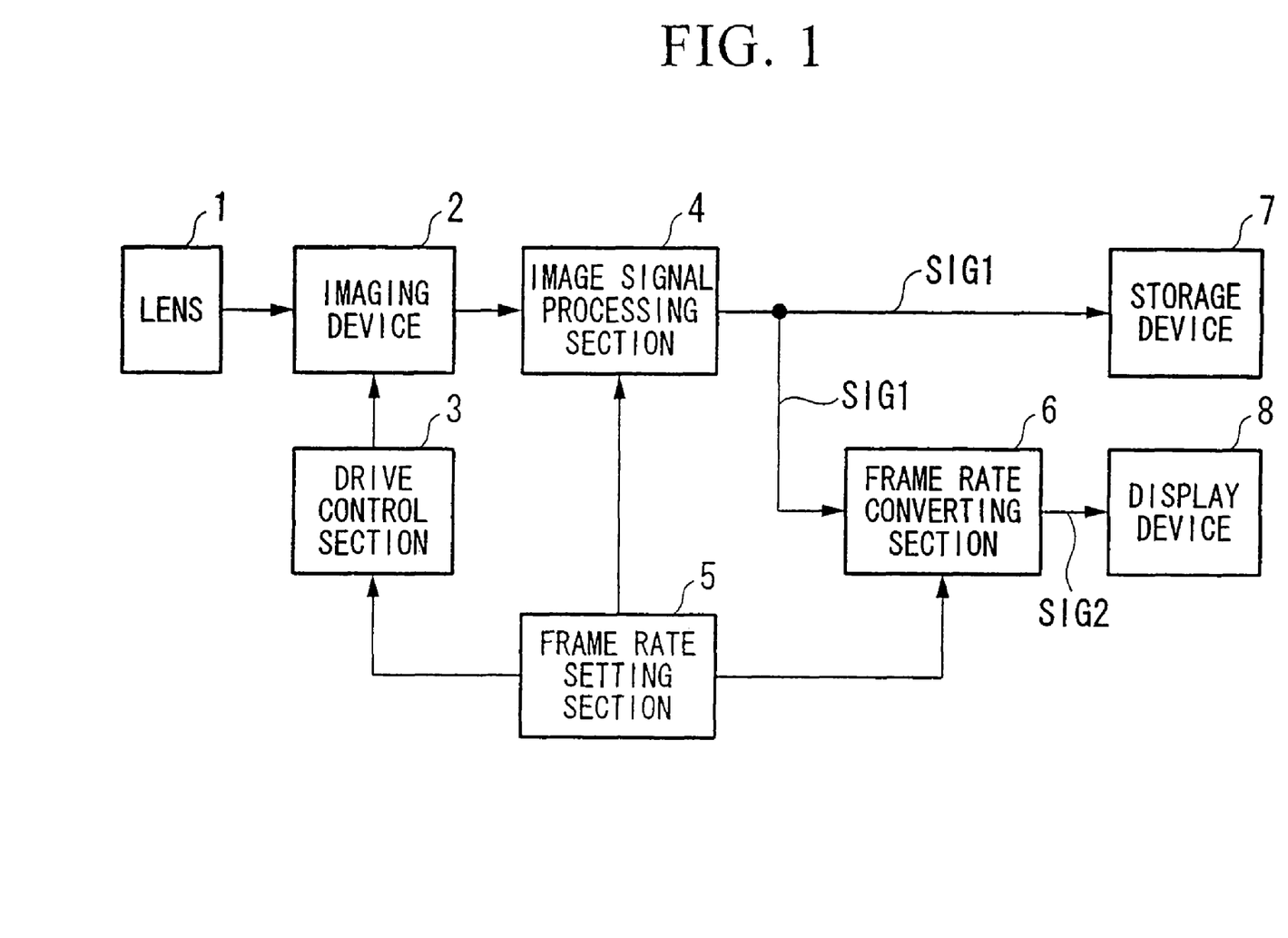
FIG. 1 is a block diagram showing the structure of an imaging apparatus as an embodiment in accordance with the present invention.

FIG. 1 is a diagram showing the structure of an imaging apparatus as an embodiment in accordance with the present invention. In FIG. 1, a lens 1 (i.e., an optical device) condenses or focuses light from a subject (not shown). The light condensed via the lens 1 is incident on an imaging device 2. The imaging device 2 performs photoelectric conversion so as to convert the incident light into an electronic signal, and outputs the converted signal as an image signal (as the first image signal of the present invention). A drive control section 3 controls drive timing, a charge storage time, or the like, of the imaging device 2.

A frame rate setting section 5 (as the first frame rate setting section and the second frame rate setting section of the present invention) is provided for setting a frame rate of the image signal and a frame rate of a display signal (as the second image signal of the present invention) used for displaying images in a display device 8. The frame rate setting section 5 sets the frame rate based on an operation signal output from a button, a switch, a rotary knob, or the like, operated by a user, and outputs data of the setting to the drive control section 3 and a frame rate converting section 6. The setting of the frame rate may be performed in advance before imaging, or performed while imaging, and any desired frame rate can be assigned for each frame.

The drive control section 3 drives the imaging device 2 at various kinds of frame rates set by the frame rate setting section 5. Accordingly, image signals of various frame rates are output from the imaging device 2. For example, the frame rate of the image signal output from the imaging device 2 is changed by adjusting the period of each frame, where this adjustment can be performed by changing the period of a vertical or a horizontal blanking interval.

Figure 3:
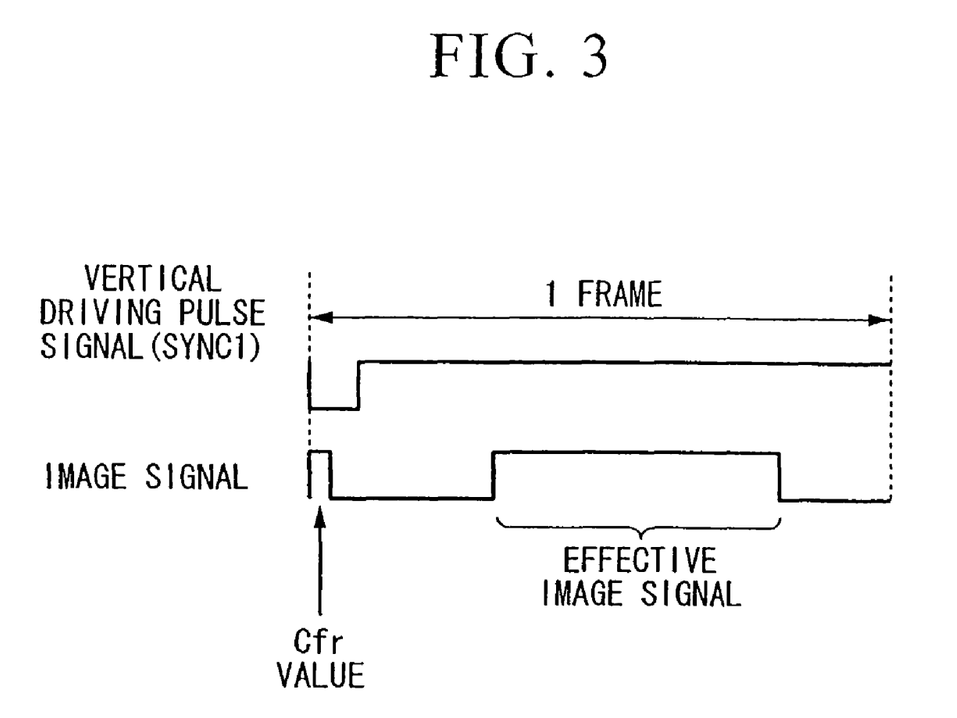
FIG. 3 is a timing chart showing the state of a signal which indicates a frame time period and is superimposed on the image signal generated in the imaging apparatus of the embodiment.

An image signal processing section 4 (as the processing section of the present invention) subjects the image signal generated by the imaging device 2 to signal processing such as noise cutting or amplification of the signal level, so as to improve the quality of the image. The image signal processing section 4 superimposes (or adds) a value of a time period Cfr of each frame (i.e., a frame time period Cfr which corresponds to the frame rate of the image signal set by the frame rate setting section 5) to the image signal of the relevant frame at a desired timing depending on a vertical driving pulse signal (see FIG. 3). For example, when the frame rate of the image signal is 30 fps (i.e., 30 frames per second), the frame time period Cfr is approximately 33.3 msec. The value of the frame time period Cfr may be indicated by the number of clock pulses, counted using the system clock of the imaging apparatus.

An image signal SIG1 processed by the image signal processing section 4 is output to a storage device 7 or the frame rate converting section 6. The storage device 7 has a storage medium such as semiconductor memory or a hard disk, and stores the input image signal to the storage medium. The frame rate converting section 6 generates a display signal SIG2 (i.e., the second image signal) having a frame rate suitable for the display signal, which is converted from the frame rate of the image signal SIG1. The frame rate converting section 6 outputs the display signal SIG2 to the display device 8. This frame rate converting section 6 is an embodiment of the frame rate converting apparatus of the present invention.

Figure 2:
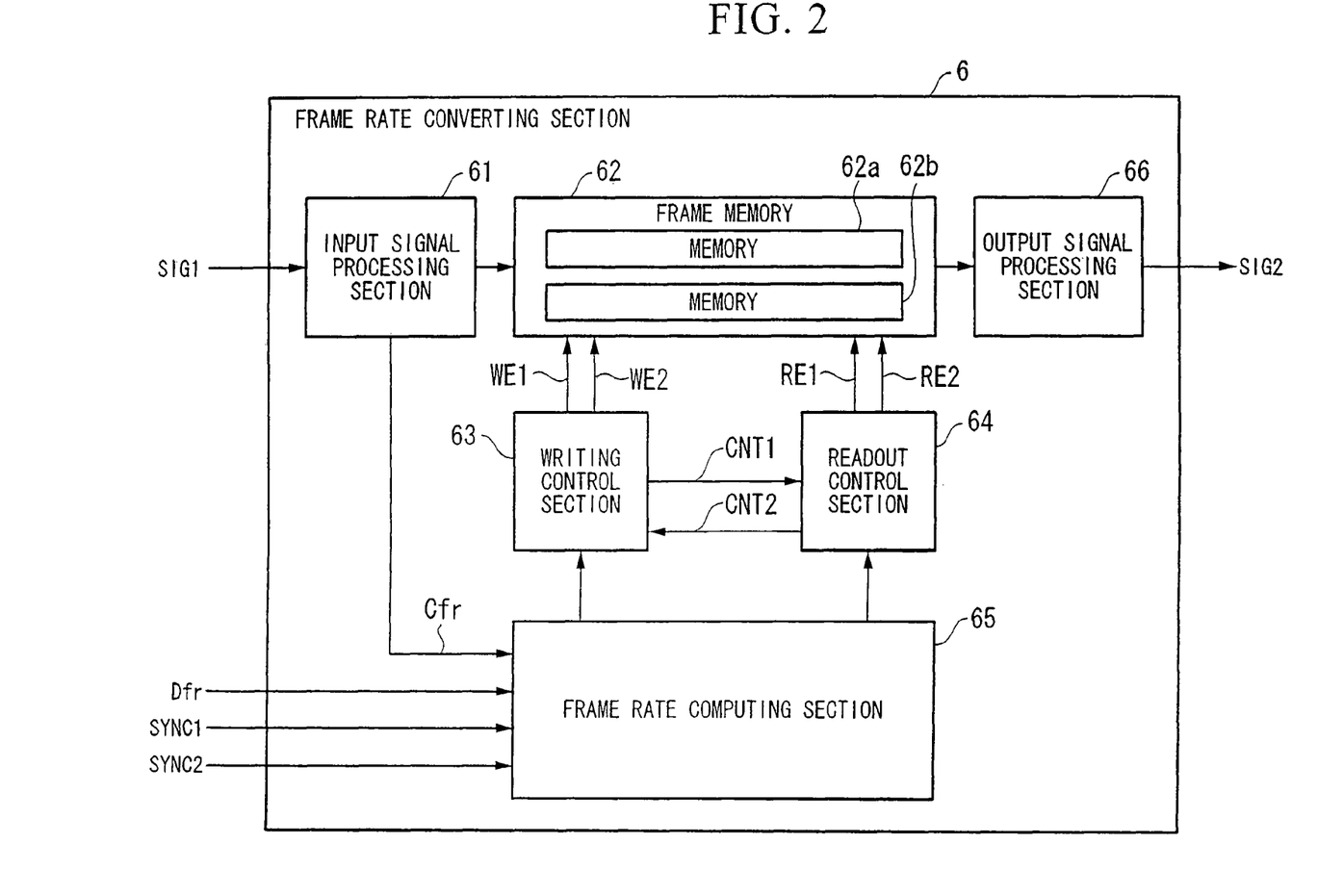
FIG. 2 is a diagram showing the structure of the frame rate converting section provided in the imaging apparatus of the embodiment.

FIG. 2 shows the structure of the frame rate converting section 6. The image signal SIG1 output from the image signal processing section 4 is input into an input signal processing section 61 (i.e., an input section). The input signal processing section 61 detects the frame time period Cfr superimposed to the image signal SIG1. The image signal SIG1 input into the input signal processing section 61 is output to a frame memory 62, and the frame time period Cfr of the image signal SIG1, detected by the input signal processing section 61, is output to a frame rate computing section 65.

The frame memory 62 (as an image storage device) is a double-buffer memory having two memory areas (i.e., a memory 62a and a memory 62b), each having a capacity for one frame. Writing of the image signal to the frame memory 62 is controlled by a writing control section 63, while readout of the image signal from the frame memory 62 is controlled by a readout control section 64.

In addition to the frame time period Cfr, a driving pulse signal SYNC1 for the image signal SIG1, a synchronizing signal SYNC2 for the display signal SIG2, and a time period Dfr of each frame (i.e., a frame time period Dfr) of the display signal SIG2 are input into the frame rate computing section 65. Based on the driving pulse signal SYNC1 for the image signal SIG1 and the synchronizing signal SYNC2 for the display signal SIG2, the frame rate computing section 65 measures a time difference $\alpha$ between the synchronization timing of both signals. The driving pulse signal SYNC1 and the synchronizing signal SYNC2 are generated based on each frame rate set by the frame rate setting section 5. The frame time period Dfr corresponding to the frame rate of the display signal SIG2 indicates a time period corresponding to one frame of the display signal SIG2. For example, similarly to the frame time period Cfr of the image signal SIG1, the frame time period Dfr may be indicated by the number of clock pulses counted using the system clock of the imaging apparatus.

The frame rate computing section 65 uses the time difference α, the frame time period Cfr of the image signal SIG1 (which is detected by the input signal processing section 61), and the frame time period Dfr of the image signal SIG2 (which is set by the frame rate setting section 5), so as to perform computation (as described later) for determining a method of outputting the image signal SIG1 in conformity with the frame rate of the display signal SIG2 (that is, outputting the image signal SIG1 as the display signal SIG2).

As described later, the method of outputting the image signal SIG1 is determined based on (i) determination whether the image signal is to be stored in each memory of the frame memory 62, (ii) determination of how many frames for forming the display signal SIG2 are read out from each memory of the frame memory 62, or the like. Based on a result of the above computation, the frame rate computing section 65 generates memory control timing which is most suitable for frame rate conversion, with respect to the writing control section 63 and the readout control section 64. In accordance with the memory control timing generated by the frame rate computing section 65, the writing control section 63 and the readout control section 64 respectively perform control of writing control signals WE1 and WE2 and control of readout control signals RE1 and RE2 with respect to writing and readout of the frame memory 62.

When storing the image signal to the memory 62a or 62b of the frame memory 62, the writing control section 63 alternately controls the writing control signals WE1 and WE2, so that the image signal is stored into the memory 62a or 62b at a desired timing. In this process, only an effective image signal (i.e., which does not include the frame time period Cfr) of the image signal SIG1 is stored in the memory 62a or 62b.

When reading out the image signal from the memory 62a or 62b of the frame memory 62, the readout control section 64 alternately controls the readout control signals RE1 and RE2, so that the image signal is read out from the memory 62a or 62b at a desired timing and a specific number of times which is determined by the frame rate computing section 65. Therefore, in accordance with the method of outputting the image signal, which is determined by the frame rate computing section 65, the image signal is read out from the frame memory 62 and is output as the display signal SIG2.

The writing control section 63 outputs a state signal CNT1 to the readout control section 64, while the readout control section 64 outputs a state signal CNT2 to the writing control section 63. In accordance with the state signals CNT1 and CNT2, the writing control section 63 and the readout control section 64 can detect (i) operation states of the memories 62a and 62b, (ii) whether the image signal stored in each memory has been updated to a new image signal in the next (i.e., the latest) writing control, and (iii) whether the image signal stored in each memory has been read out a specific number of times determined by the frame rate computing section 65.

In accordance with the operation of the frame rate converting section 6, the image signal of each frame, as the display signal SIG2, is read out from the frame memory 62, and writing control and readout control for the same memory are not simultaneously performed. For example, at the next frame display timing of the display signal SIG2 after the image signal stored in the memory 62a is read out a specific number of times determined by the frame rate computing section 65, if readout of the image signal from the memory 62b is commanded by the readout control section 64 before writing of the image signal to the memory 62b (performed by the writing control section 63) is completed, then the readout control section 64 performs control so that the image signal is read out from the memory 62a at a desired timing.

An output signal processing section 66 performs switching between the image signals read out from the memories 62a and 62b, and outputs the display signal SIG2 having a converted frame rate.

The display signal SIG2 is output to the display device 8 (e.g., an electronic viewfinder of the imaging apparatus, or a monitor connected to the imaging apparatus), and the display device 8 performs a display operation based on the display signal SIG2. The frame rate computing section 65 is an embodiment of the detecting section and the determining section of the present invention, and the writing control section 63, the readout control section 64, and the output signal control section 66 form an embodiment of the output section of the present invention (here, the writing control section 63 indirectly performs control for signal readout (or output) timing).

Figure 4:
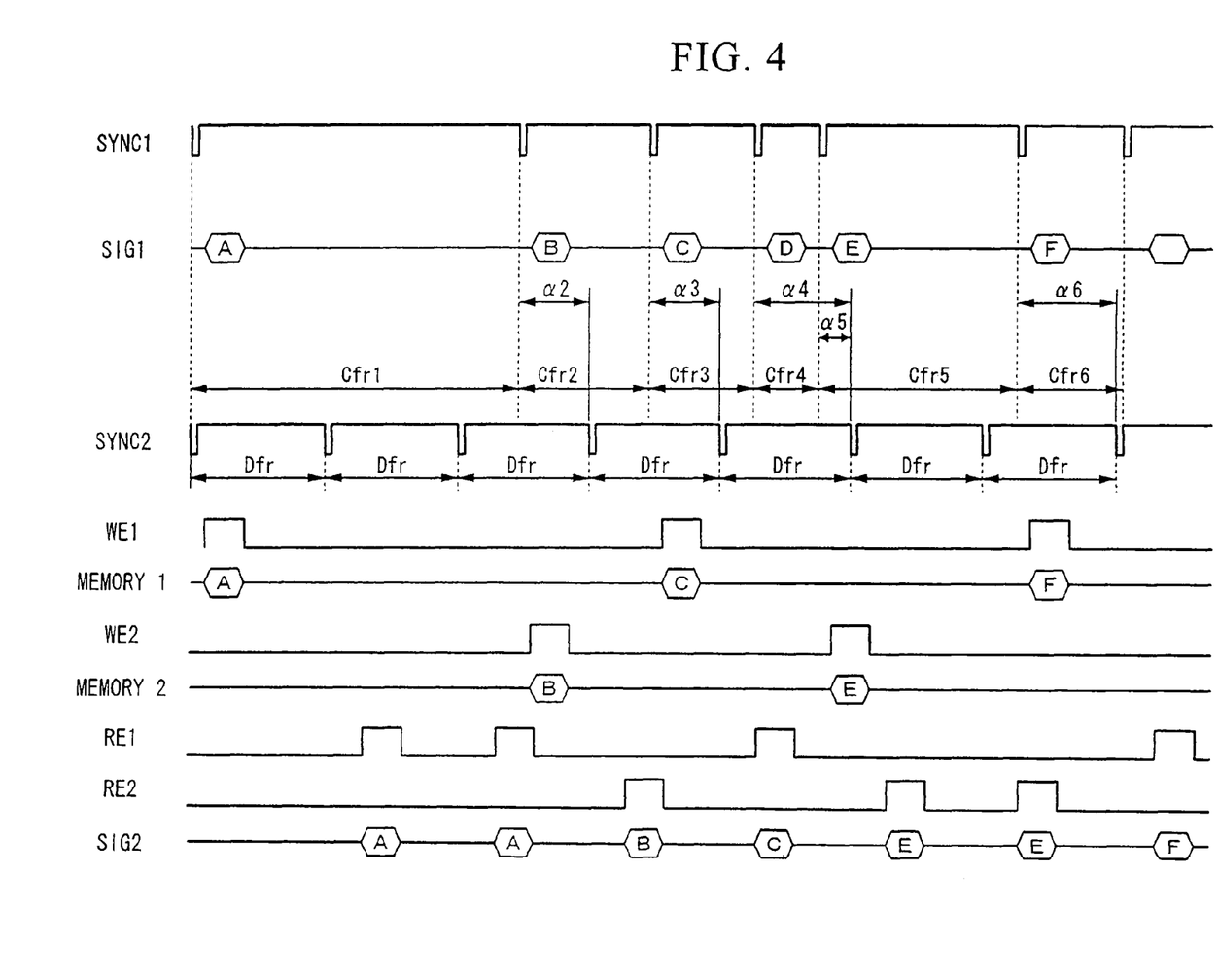
FIG. 4 is a timing chart explaining the main operation of the frame rate converting section provided in the imaging apparatus of the embodiment.

Below, methods of storing and reading out the image signal with respect to the frame memory 62 will be explained. FIG. 4 shows the state of each signal observed when the frame rate of the imaging signal SIG1 is varied for each frame, in order of 9.8 fps (i.e., 9.8 frames per second), 24 fps, 30 fps, 48, fps, 16 fps, and 30 fps.

In FIG. 4, the frame rate of the image signal SIG1 is changed when the period of the vertical blanking interval for the driving pulse signal SYNC1 (e.g., a vertical driving pulse signal) is changed. For each frame, the period for reading out an effective image from the imaging device 2 is constant. In FIG. 4, the image signal SIG1 changes in order of image signal A, image signal B, image signal C, image signal D, image signal E, and image signal F for each frame. Below, an example case in which the frame rate of the display signal SIG2 is set to 24 fps by the frame rate setting section 5 will be described.

When the image signal A (having a frame rate of 9.8 fps) of the first frame in the image signal SIG1 is input into the frame rate converting section 6, the frame time period Cfr1 of the image signal A is detected by the input signal processing section 61. Regarding the image signal A, the driving pulse signal SYNC1 for the image signal SIG1 and the synchronizing signal SYNC2 of the display signal SIG2 fall at the same timing (i.e., both signals are synchronized with each other); thus, a time difference α1 with respect to the synchronization timing is zero. In addition the frame rate of the display signal SIG2 is 24 fps, and the frame time period therefor is Dfr.

When the system clock frequency of the imaging apparatus is 74.25 MHz, (i) the frame time period Cfr1 corresponding to the frame rate 9.8 fps has approximately 7576531 counts (i.e., system clock pulses), and (ii) the frame time period Dfr corresponding to the frame rate of 24 fps has approximately 3093750 counts (i.e., system clock pulses), where Cfr1>Dfr. In accordance with the conditions of α1=0 and Cfr1>Dfr, the frame rate computing section 65 computes a value X1 obtained by dividing Cfr1 by Dfr while counting fractions of 0.5 and over as one and disregarding the rest. The actual division is "Cfr1/Dfr=7576531/3093750≅2.4; thus, X1=2. Accordingly, the writing control section 63 and the readout control section 64 are controlled so that the image signal A is output (or reproduced) twice as an image signal to be displayed (i.e., a display signal).

More specifically, the image signal A of the first frame in the image signal SIG1 is stored in the memory 62a (see "MEMORY 1" in FIG. 4) by using the writing control signal WE1. In accordance with the readout control signal RE1, the image signal A stored in the memory 62a is repeatedly read out twice at a specific timing determined using the synchronizing signal SYNC2 (for the display signal SIG2).

Next, when the image signal B (having a frame rate of 24 fps) of the second frame in the image signal SIG1 is input into the frame rate converting section 6, a frame time period Cfr2 of the image signal B is detected by the input signal processing section 61. Regarding the image signal B, a time difference $\alpha 2$ between the driving pulse signal SYNC1 and the synchronizing signal SYNC2 with respect to the synchronization timing is not zero. The frame time period of the display signal SIG2 is Dfr, similarly to the previous frame.

In accordance with the conditions of $\alpha 2 \neq 0$, $\alpha 2 < Cfr2$, and $(Cfr2 - \alpha 2) \leq Dfr$, the frame rate computing section 65 commands the writing control section 63 and the reading control section 64 to output the image signal B only once as the display signal.

More specifically, the image signal B of the second frame in the image signal SIG1 is stored in the memory 62b (see "MEMORY 2" in FIG. 4) by using the writing control signal WE2. In accordance with the readout control signal RE2, the image signal B stored in the memory 62b is read out once at a specific timing determined using the synchronizing signal SYNC2 (for the display signal SIG2).

Next, when the image signal C (having a frame rate of 30 fps) of the third frame in the image signal SIG1 is input into the frame rate converting section 6, a frame time period Cfr3 of the image signal C is detected by the input signal processing section 61. Regarding the image signal C, a time difference $\alpha 3$ between the driving pulse signal SYNC1 and the synchronizing signal SYNC2 with respect to the synchronization timing is not zero. The frame time period of the display signal SIG2 is Dfr, similarly to the previous frame.

In accordance with the conditions of $\alpha 3 \neq 0$, $\alpha 3 < Cfr3$, and $(Cfr3 - \alpha 3) \leq Dfr$, the frame rate computing section 65 commands the writing control section 63 and the reading control section 64 to output the image signal C only once as the display signal.

More specifically, the image signal C of the third frame in the image signal SIG1 is stored in the memory 62a by using the writing control signal WE1. In accordance with the readout control signal RE1, the image signal C stored in the memory 62a is read out once at a specific timing determined using the synchronizing signal SYNC2.

Next, when the image signal D (having a frame rate of 48 fps) of the fourth frame in the image signal SIG1 is input into the frame rate converting section 6, a frame time period Cfr4 of the image signal D is detected by the input signal processing section 61. Regarding the image signal D, a time difference $\alpha 4$ between the driving pulse signal SYNC1 and the synchronizing signal SYNC2 with respect to the synchronization timing is not zero. The frame time period of the display signal SIG2 is Dfr, similarly to the previous frame.

In accordance with the conditions of $\alpha 4 \neq 0$ and $\alpha 4 \geq Cfr4$, the frame rate computing section 65 commands the writing control section 63 and the reading control section 64 not to store the image signal D in the frame memory 62 and thus not to output the image signal as the display signal.

More specifically, the image signal D of the fourth frame in the image signal SIG1 is not stored in the memory 62b in accordance with control of the writing control signal WE2, and is thus deleted in the input signal processing section 61, so that this signal is not output as the display signal.

Next, when the image signal E (having a frame rate of 16 fps) of the fifth frame in the image signal SIG1 is input into the frame rate converting section 6, a frame time period Cfr5 of the image signal E is detected by the input signal processing section 61. Regarding the image signal E, a time difference $\alpha 5$ between the driving pulse signal SYNC1 and the synchronizing signal SYNC2 with respect to the synchronization timing is not zero. The frame time period of the display signal SIG2 is Dfr, similarly to the previous frame.

In accordance with the conditions of $\alpha 5 \neq 0$, $\alpha 5 < Cfr5$, and $(Cfr5 - \alpha 5) > Dfr$, the frame rate computing section 65 computes a value Y5 obtained by dividing $(Cfr5 - \alpha 5)$ by Dfr while counting fractions of 0.5 and over as one and disregarding the rest. Here, Y5=1; thus, the frame rate computing section 65 commands the writing control section 63 and the reading control section 64 to output the image signal E only once as the display signal.

More specifically, the image signal E of the fifth frame in the image signal SIG1 is stored in the memory 62b by using the writing control signal WE2. In accordance with the readout control signal RE2, the image signal E stored in the memory 62b is read out once at a specific timing determined using the synchronizing signal SYNC2.

At the next frame display timing following the display of the frame of the image signal E (which was read out once from the memory 62b and displayed as the display signal SIG2), the image signal stored in the memory 62a is the image signal C which has already been read out. That is, in accordance with control using the writing control signal WE1, the image signal stored in the memory 62a has not yet been updated to the image signal F of the next frame in the image signal SIG1. In this case, in accordance with control using the readout control signal RE2, the image signal E is again read out from the memory 62b at a specific timing determined using the synchronizing signal SYNC2.

Next, when the image signal F (having a frame rate of 30 fps) of the sixth frame in the image signal SIG1 is input into the frame rate converting section 6, a frame time period Cfr6 of the image signal F is detected by the input signal processing section 61. Regarding the image signal F, a time difference $\alpha 6$ between the driving pulse signal SYNC1 and the synchronizing signal SYNC2 with respect to the synchronization timing is not zero. The frame time period of the display signal SIG2 is Dfr, similarly to the previous frame.

In accordance with the conditions of $\alpha 6 \neq 0$, $\alpha 6 < Cfr6$, and $(Cfr6 - \alpha 6) \leq Dfr$, the frame rate computing section 65 commands the writing control section 63 and the reading control section 64 to output the image signal F only once as the display signal.

More specifically, the image signal F of the sixth frame in the image signal SIG1 is stored in the memory 62a by using the writing control signal WE1. In accordance with the readout control signal RE1, the image signal C stored in the memory 62a is read out once at a specific timing determined using the synchronizing signal SYNC2.

The image signal read out from each of the memories 62a and 62b is output as the display signal SIG2 from the output signal processing section 66. This display signal SIG2 after the frame rate conversion has a frame rate of 24 fps, that is, the image signal having any frame rate is converted to a signal having a specific (or desired) frame rate (here, 24 fps).

Figure 5:
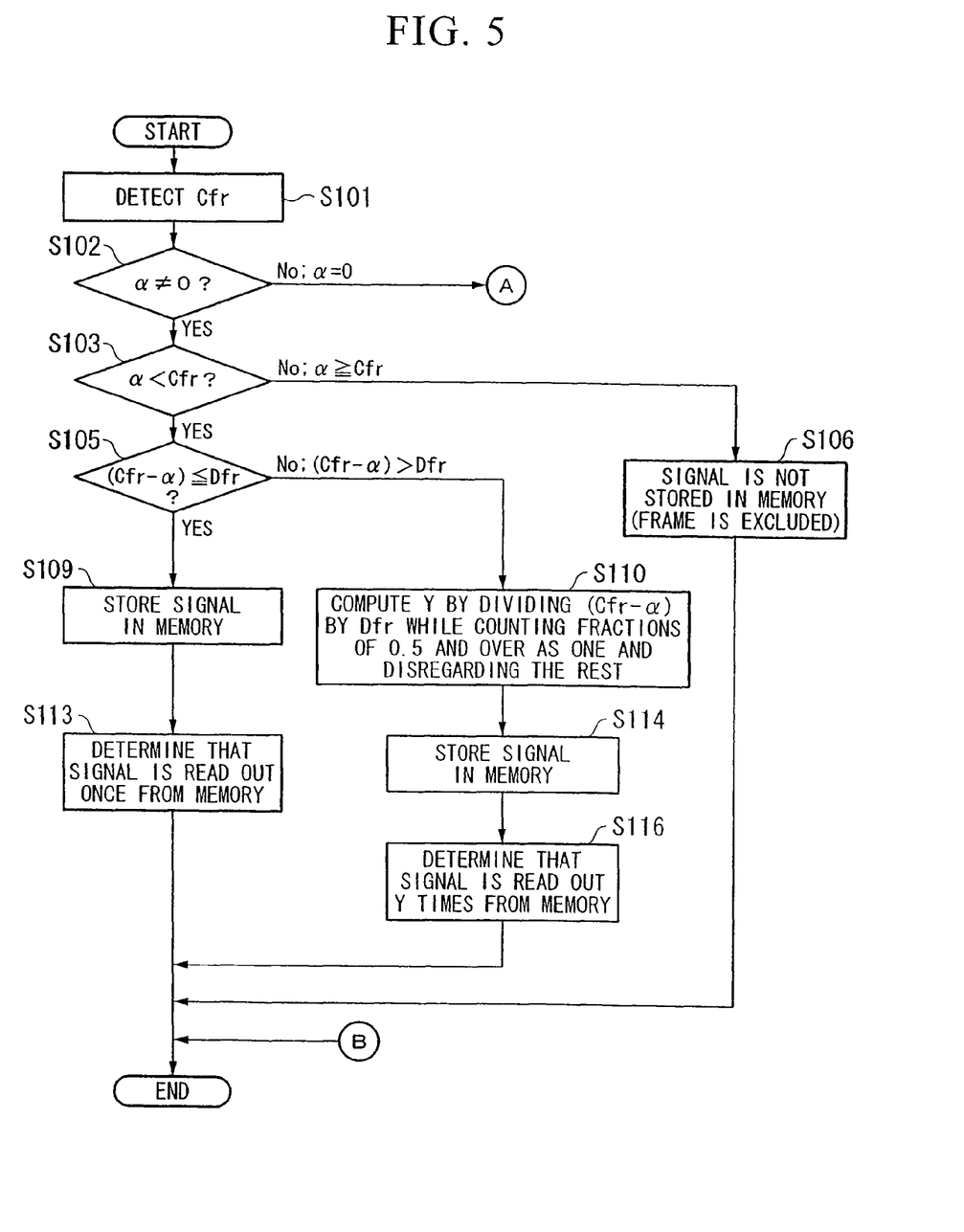
FIG. 5 is a flowchart of the main operation of the frame rate converting section provided in the imaging apparatus of the embodiment.
Figure 6:
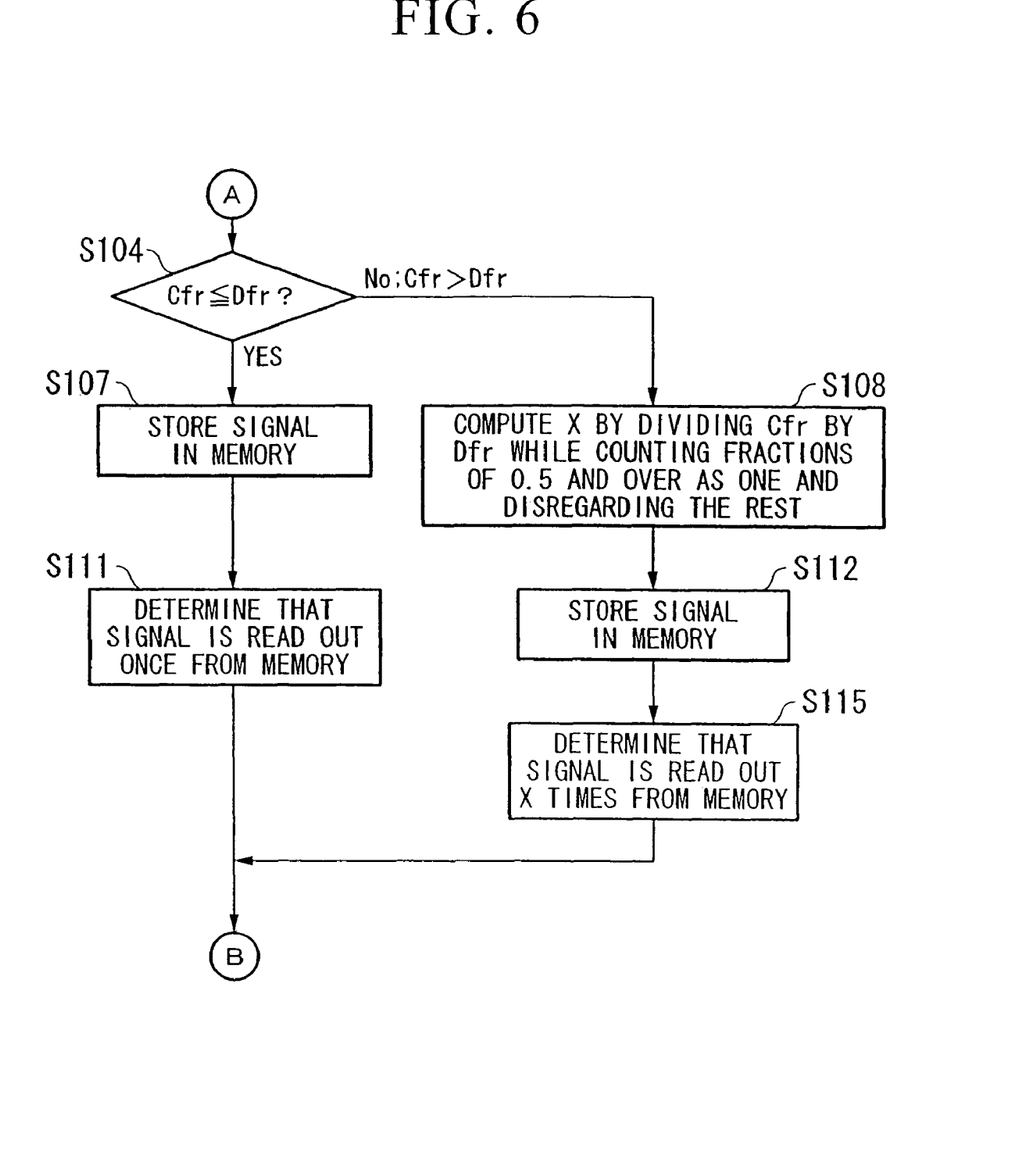
FIG. 6 is also a flowchart of the main operation of the frame rate converting section provided in the imaging apparatus of the embodiment.

The detailed procedure for the above-described main operation of the frame rate converting section 6 will be explained with reference to FIGS. 5 and 6, which show steps of the operation for converting the frame rate of any frame in the input image signal. Every time the image signal of each frame in the image signal SIG1 is input into the frame rate converting section 6, the operation shown in FIGS. 5 and 6 is performed. That is, when the image signal of any frame in the image signal SIG1 is input into the frame rate converting section 6, the frame rate converting operation as described below is started.

First, the input signal processing section 61 detects the frame time period Cfr of the image signal of the target frame by referring to the CFr value superimposed to the input image signal SIG1, and outputs the detected Cfr to the frame rate computing section 65 (see step S101). In the next step S102, the frame rate computing section 65 measures the time difference α between the driving pulse signal SYNC1 (for the image signal SIG1) and the synchronizing signal SYNC2 (for the display signal SIG2) with respect to the synchronization timing, and determines whether α is zero.

When α is not zero, the frame rate computing section 65 compares α with Cfr (see step S103). When α is smaller than Cfr, the frame rate computing section 65 compares "Cfr−α" with Dfr (see step S105). When Cfr−α is equal to or smaller than Dfr (e.g., when the frame rate of the image signal SIG1 is 24 fps (see the image signal B) or 30 fps (see the image signals C and F) in FIG. 4), the frame rate computing section 65 commands the writing control section 63 to store the image signal. The commanded writing control section 63 outputs the writing control signal WE1 or WE2 so as to store the image signal into the memory 62a or 62b (see step S109).

In the next step S113, the frame rate computing section 65 determines that the image signal is read out once from the memory 65a or 65b. After this step, the frame rate computing section 65 commands the readout control section 64 to read out the image signal at a desired timing. The commanded readout control section 64 outputs the readout control signal RE1 or RE2, so as to read out the image signal from the memory 62a or 62b. The image signal read out from the memory 62a or 62b is output to the display device 8 at a timing in accordance with the frame rate of the display signal SIG2, and display operation is performed by the display device 8.

When Cfr−α is greater than Dfr in step S105 (e.g., when the frame rate of the image signal SIG1 is 16 fps (see the image signal E)), the frame rate computing section 65 computes a value Y obtained by dividing (Cfr−α) by Dfr while counting fractions of 0.5 and over as one and disregarding the rest (see step S110). In the next step S114, the image signal is stored into the memory 62a or 62b in a manner similar to that described above. Based on the result of computation in step S110, the frame rate computing section 65 determines that readout operation from the memory 62a or 62b is repeated Y times at a desired timing (see step S116).

After this process, the frame rate computing section 65 commands the readout control section 64 so as to repeatedly read out the same image signal Y times from the memory 62a or 62b. That is, the image signal of a frame, stored in the memory 62a or 62b, is reproduced Y times, thereby producing an image signal of Y frames. The read out image signal is output to the display device 8 at a timing in accordance with the frame rate of the display signal SIG2, and display operation is performed by the display device 8.

When α is equal to or greater than Cfr in step S103, (e.g., when the frame rate of the image signal SIG1 is 48 fps (see the image signal D) in FIG. 4), the frame rate computing section 65 determines that no image signal is stored into the frame memory 62 (that is, the image signal of the target frame in the image signal SIG1 is not output as the display signal SIG2) (see step S106). As a result, the image signal of the target frame in the image signal SIG1 is not stored in the frame memory 62, and the signal of the relevant frame is excluded, and the process of converting the frame rate of this frame is terminated.

When α is zero in step S102, the frame rate computing section 65 compares Cfr with Dfr (see step S104). When Cfr is equal to or smaller than Dfr, the image signal is stored in the memory 62a or 62b in a process similar to that described above (see step S107). In the next step S111, the frame rate computing section 65 determines that the image signal is read out once from the memory 62a or 62b. After this step, the image signal is stored in the memory 62a or 62b in a process similar to that described above. The image signal read out from the memory 62a or 62b is output to the display device 8 at a timing in accordance with the frame rate of the display signal SIG2, and display operation is performed by the display device 8.

When Cfr is greater than Dfr in step S104 (e.g., when the frame rate of the image signal SIG1 is 9.8 fps (see the image signal A) in FIG. 4), the frame rate computing section 65 computes a value X obtained by dividing Cfr by Dfr while counting fractions of 0.5 and over as one and disregarding the rest (see step S108). In the next step S112, the image signal is stored in the memory 62a or 62b in a process similar to that described above. Based on the result of computation in step S108, the frame rate computing section 65 determines that readout from the memory 62a or 62b is repeated X times at a desired timing (see step S115).

After this step, the frame rate computing section 65 commands the readout control section 64 so as to repeatedly read out the same image signal X times from the memory 62a or 62b. That is, the image signal of the target frame, stored in the memory 62a or 62b, is reproduced X times, thereby producing an image signal of X frames as the display signal SIG2. The read out image signal is output to the display device 8 at timing in accordance with the frame rate of the display signal SIG2, and display operation is performed by the display device 8.

In accordance with the above operation, the image signal of each frame, having any frame rate, in the image signal SIG1 is converted to have a frame rate which coincides with that of the display signal SIG2.

As described above, the frame rate converting apparatus (i.e., the frame rate converting section 6) provided in the imaging apparatus of the present embodiment determines a method of outputting the image signal SIG1 in conformity with the frame rate of the display signal SIG2, based on (i) the time difference α between the synchronization timing of each frame of the image signal SIG1 and the synchronization timing of each frame of the display signal SIG2, and (ii) the time period Cfr of each frame of the image signal SIG1 and the time period Dfr of each frame of the display signal SIG2. For any frame rate of the image signal SIG1, unique values for the time difference α and the time periods Cfr and Dfr can be determined. Based on the determined values, a unique method of outputting the image signal SIG1 in conformity with the frame rate of the display signal SIG2 is determined, thereby generating the display signal SIG2 having a frame rate appropriately converted from the frame rate of the image signal SIG1.

In addition, only the image signal determined to be output as the display signal SIG2 is stored in the frame memory 62; thus, the memory size of the frame memory 62 can be minimized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described embodiment, the image signal obtained by converting the frame rate of the image signal output from the imaging device 2 is output to the display device 8; however, the image signal after the frame rate conversion may be stored in the storage device 7. In addition, the image signal stored in the storage device 7, which has not yet been subjected to the frame rate conversion, may be reproduced while a reproduced signal is subjected to frame rate conversion as described above.

The frame rate of the image signal output from the imaging device 2 may be changed by adjusting the period of each frame, where the adjustment may be performed by changing (by the drive control section 3) the period of a vertical or a horizontal blanking interval. The frame rate may also be changed by adjusting the timing of driving the imaging device 2, where the timing is generated by the drive control section 3. In addition, each of the frame time period Cfr (corresponding to the frame rate of the image signal) and the frame time period Dfr (corresponding to the frame rate of the display signal) must indicate a time length corresponding to a relevant frame, and each frame time period may be represented using a parameter other than the number of clock pulses of the system clock of the imaging apparatus.

In the image signal processing section 4, the value of the frame time period Cfr corresponding to the frame rate of the image signal, set by the frame rate setting section 5, is superimposed to the image signal of the relevant frame at a desired timing of a vertical driving pulse signal; however, instead of superimposing the frame time period Cfr for each frame to the image signal, the frame time period Cfr may be directly set in the frame rate converting section 6.

In accordance with the present invention, for any frame rate of the first image signal, unique values for (i) the time difference α (between the synchronization timing of each frame of the first image signal and the synchronization timing of each frame of the second image signal) and (ii) the time period Cfr of each frame of the first image signal and the time period Dfr of each frame of the second image signal can be determined. Based on the determined values, a unique method of outputting the first image signal in conformity of the frame rate of the second image signal is determined, thereby generating the second image signal having a frame rate appropriately converted from the frame rate of the first image signal.

What is claimed is:

1. A frame rate converting apparatus for converting a frame rate of an input first image signal and outputting the image signal having the converted frame rate as a second image signal, the apparatus comprising:
   an input section into which the first image signal is input;
   a detecting section for detecting a time difference α between synchronization timing of each frame of the first image signal and synchronization timing of each frame of the second image signal;
   a determining section for determining an output method of outputting the first image signal in conformity with a frame rate of the second image signal, based on a time period Cfr of each frame of the first image signal, a time period Dfr of each frame of the second image signal, and the time difference α detected by the detecting section; and
   an output section for outputting the first image signal as the second image signal in accordance with the output method determined by the determining section.

2. The frame rate converting apparatus in accordance with claim 1, wherein regarding an image signal of any frame N in the input first image signal, when the time difference α detected by the detecting section is zero, the determining section compares the time period Cfr of the image signal of the frame N with the frame period Dfr of the second image signal, and if $Cfr \leq Dfr$, the determining section determines that the image signal of the frame N is output as an image signal of one frame of the second image signal.

3. The frame rate converting apparatus in accordance with claim 1, wherein regarding an image signal of any frame N in the input first image signal, when the time difference α detected by the detecting section is zero, the determining section compares the time period Cfr of the image signal of the frame N with the frame period Dfr of the second image signal, and if $Cfr > Dfr$, the determining section computes a value X obtained by dividing Cfr by Dfr while counting fractions of 0.5 and over as one and disregarding the rest, and determines that a signal obtained by reproducing the image signal of the frame N X times is output as an image signal of X frames of the second image signal.

4. The frame rate converting apparatus in accordance with claim 1, wherein regarding an image signal of any frame N in the input first image signal, when the time difference α detected by the detecting section is not zero, the determining section refers to the time difference α, the time period Cfr of the image signal of the frame N, and the frame period Dfr of the second image signal, and if $\alpha < Cfr$, and $(Cfr - \alpha) \leq Dfr$, the determining section determines that the image signal of the frame N is output as an image signal of one frame of the second image signal.

5. The frame rate converting apparatus in accordance with claim 1, wherein regarding an image signal of any frame N in the input first image signal, when the time difference α detected by the detecting section is not zero, the determining section refers to the time difference α, the time period Cfr of the image signal of the frame N, and the frame period Dfr of the second image signal, and if $\alpha < Cfr$, and $(Cfr - \alpha) > Dfr$, the determining section computes a value Y obtained by dividing $(Cfr - \alpha)$ by Dfr while counting fractions of 0.5 and over as one and disregarding the rest, and determines that a signal obtained by reproducing the image signal of the frame N Y times is output as an image signal of Y frames of the second image signal.

6. The frame rate converting apparatus in accordance with claim 1, wherein regarding an image signal of any frame N in the input first image signal, when the time difference α detected by the detecting section is not zero, the determining section compares the time difference α with the time period Cfr of the image signal of the frame N, and if $\alpha \geq Cfr$, the determining section determines that the image signal of the frame N is not output as the second image signal.

7. The frame rate converting apparatus in accordance with claim 1, further comprising:
   an image storage device for storing only each image signal determined to be output as the second image signal, among image signals of frames which form the first image signal,
   wherein the output section reads out each image signal from the image storage device and outputs the read out signal as the second image signal.

8. The frame rate converting apparatus in accordance with claim 1, wherein a value relating to the time period Cfr is added to an image signal of each frame which forms the first image signal.

9. An imaging apparatus comprising:
the frame rate converting apparatus in accordance with claim 1;
an optical device for imaging a subject;
an imaging device for performing photoelectric conversion of an image of the subject obtained by the optical device, so as to generate the first image signal; and
a signal processing section for processing the first image signal generated by the imaging device, and outputting the processed signal to the frame rate converting apparatus.

10. The imaging apparatus in accordance with claim 9, further comprising:
a section for setting the frame rate of the first image signal.

11. The imaging apparatus in accordance with claim 9, further comprising:
a section for setting the frame rate of the second image signal.

* * * * *